United States Patent
Khanna

(10) Patent No.: US 7,124,226 B2
(45) Date of Patent: Oct. 17, 2006

(54) METHOD OR APPARATUS FOR ESTABLISHING A PLUG AND PLAY (PNP) COMMUNICATION CHANNEL VIA AN ABSTRACTION LAYER INTERFACE

(75) Inventor: Rahul Khanna, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 09/773,202

(22) Filed: Jan. 30, 2001

(65) Prior Publication Data

US 2002/0147870 A1 Oct. 10, 2002

(51) Int. Cl.
*G06F 13/00* (2006.01)

(52) U.S. Cl. .............. 710/300; 710/8; 710/62

(58) Field of Classification Search ........... 710/100, 710/305, 313, 310, 301, 302, 8, 10, 16, 62, 710/300; 713/2; 358/1.15
See application file for complete search history.

(56) References Cited

U.S. PATENT DOCUMENTS

| | | | | |
|---|---|---|---|---|
| 5,566,346 A | * | 10/1996 | Andert et al. | 710/8 |
| 5,689,726 A | * | 11/1997 | Lin | 710/10 |
| 5,727,212 A | * | 3/1998 | Dinallo | 719/321 |
| 5,794,032 A | * | 8/1998 | Leyda | 713/2 |
| 5,815,731 A | * | 9/1998 | Doyle et al. | 710/10 |
| 5,922,055 A | * | 7/1999 | Shahar et al. | 710/16 |
| 5,974,474 A | * | 10/1999 | Furner et al. | 710/8 |
| 6,032,201 A | * | 2/2000 | Tillery et al. | 710/8 |
| 6,058,445 A | * | 5/2000 | Chari et al. | 710/302 |
| 6,301,011 B1 | * | 10/2001 | Fung et al. | 358/1.15 |
| 6,415,337 B1 | * | 7/2002 | Chung | 710/16 |
| 6,550,006 B1 | | 4/2003 | Khanna | |
| 6,609,151 B1 | | 8/2003 | Khanna et al. | |
| 6,633,929 B1 | * | 10/2003 | Hyder et al. | 710/62 |
| 6,721,868 B1 | | 4/2004 | Natu et al. | |
| 2003/0200273 A1 | | 10/2003 | Khanna et al. | |

OTHER PUBLICATIONS

Natu et al; Remote Fault-Resileint Bios Recovery, Pending U.S. Appl. No. 09/639,920 (P9053), 27 pages.

* cited by examiner

Primary Examiner—Mark H. Rinehart
Assistant Examiner—Justin I. King
(74) Attorney, Agent, or Firm—Rob D. Anderson

(57) ABSTRACT

A method and system for accessing devices through use of an abstraction layer interface that "hides" the access methods from components accessing the devices, such as device drivers and OPROMs. The abstraction layer interface includes a set of resource access methods and a database containing bus, device, function and resource information for various devices in a system. During an initialization process, bus and device configuration information is determined and stored in the database. When an application or operating system requests access to a device, the application or OS uses the device's device driver or OPROM to pass identification information, resource information and one or more resource access commands to the abstraction layer interface, which then verifies the identification information against the database, and converts the resource access request into appropriate resource access methods that are used to access the device.

27 Claims, 7 Drawing Sheets

METHOD OR APPARATUS FOR ESTABLISHING A PLUG AND PLAY (PNP) COMMUNICATION CHANNEL VIA AN ABSTRACTION LAYER INTERFACE

BACKGROUND OF THE INVENTION

1. Field of the Invention

The present invention generally concerns access methods for computer peripheral devices, and in more particular concerns an access scheme that enables communication between a component and a peripheral device via an abstraction layer interface that prevents the component from directly accessing the device.

2. Background Information A typical computer platform, such as a personal computer, workstation, or server, generally includes one or more root buses to which various peripheral devices (devices) may be connected. These root buses include PCI buses, which are commonly found in many newer computers, as well as ISA, EISA, and microchannel buses, which are termed legacy buses.

"Plug and play" functionality was introduced to the personal computer world when the PCI bus first became available in 1993. Plug and play functionality enables operating systems and other computer software and hardware to become apprised of a PCI device's capabilities and characteristics, whereby the user is not required to provide such configuration information. For example, on a first reboot after a PCI card has been installed, an operating system may be able to determine that the PCI card is a video card or modem with certain characteristics, and may further automatically configure the device, including identifying appropriate device drivers, and loading such drivers into the operating system when the PCI card is initialized.

While configuring PCI devices on a single root bus is generally handled well by today's computers, it is anticipated that more powerful computers and servers will be introduced that support a variety of different interface and peripheral types through the use of multiple root buses. In some configurations, these root buses may comprise fundamentally different types of root buses.

With most present BIOS's, an open IO (input/output) access is used. This means that IO access methods are assumed uniform through the POST process, and any device driver or optional ROM (OPROM) has full access to every other device's resources. There are situations where some devices may violate the access of other devices. For example, they can overwrite a resource without moving that resource, or self identify other devices so as to create problems for OPROM devices. They may also have unrestricted IO access (e.g., ISA bus devices). In addition, a driver may generate a PCI reset of its own without the POST process knowing about it. These problems become even larger in multiple root bus platforms.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention provides a method and system for accessing devices through use of an abstraction layer interface that "hides" the access methods from components accessing the devices, such as device drivers and OPROMs. The abstraction layer interface includes a set of resource access methods and a database containing bus, device, function and resource information for various devices in a system. During an initialization process, bus and device configuration information is determined and stored in the database. When an application or operating system requests access to a device, the application or OS uses the device's device driver or OPROM to pass identification information, resource information and one or more resource access commands to the abstraction layer interface, which then verifies the identification information against the database, and converts the resource access request into appropriate resource access methods that are used to access the device.

Figure 1:
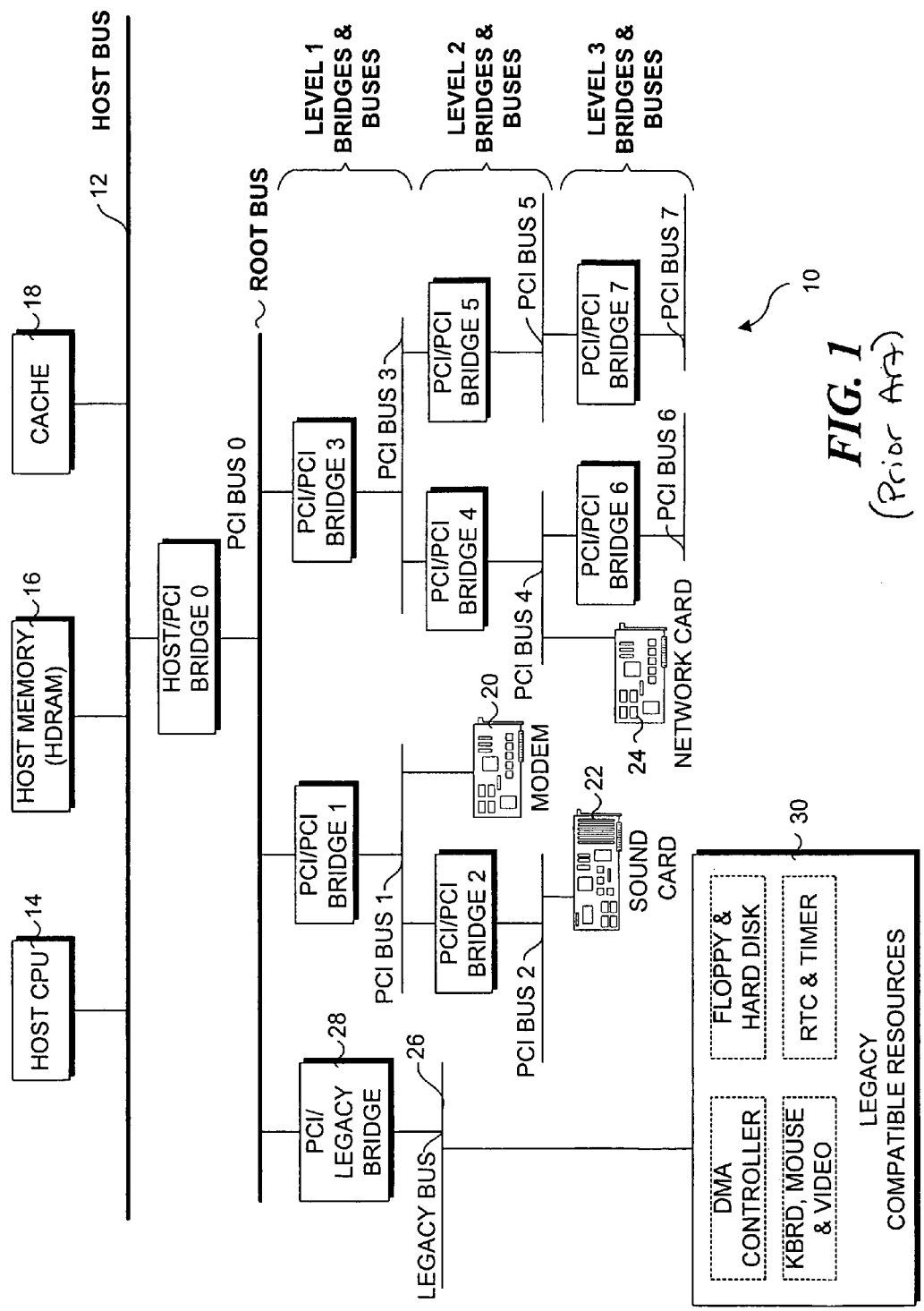
FIG. 1 is a schematic block diagram illustrating a multiple layer bus configuration.

FIG. 1 shows a portion of a typical bus configuration 10 that includes a PC-type root bus depicted as PCI bus 0. Although the following description concerns the use of PCI root buses in particular, it will be understood that the principles and techniques of the present invention disclosed herein may be applied to other types of root buses as well. Bus configuration 10 includes a host bus 12 to which a host CPU 14, host memory 16, and cache 18 are connected. In general, for a given system host CPU 14 will be the primary bus master for the system, and will be used to service interrupt and handle system errors. Typical processors that may be used for host CPU 14 include the INTEL Pentium™ class processors, as well as processors made by other manufacturers including Motorola, IBM, SUN, and Hewlett-Packard.

As illustrated in FIG. 1, the various buses in a system comprise a hierarchy that includes one or more levels, wherein buses at a lower level are subordinate to buses at a higher level. The first subordinate bus level below the host bus is the root bus, which comprises a PCI Bus 0 in bus configuration 10. Additional levels depicted in FIG. 1 include a level 1, a level 2, and a level 3.

Buses between levels are enabled to communicate with one another through use of "bridges." The primary purpose of a bridge is to interface one bus protocol to another. The protocol includes the definition of the bus control signals lines, and data and address sizes. For example, a host/PCI bridge 0 is used to enable communication between host bus 12 and PCI bus 0. Under conventional terminology, a bridge is labeled to correspond to its subordinate bus, i.e., a bridge "n" will correspondingly to a PCI Bus "n" or other type of Bus "n." When a bridge interfaces similar bus types, the bridge primarily limits the loading or each bus. Instances of these types of bridges are illustrated by the various PCI/PCI bridges in FIG. 1. Bus configuration 10 also includes several PCI peripheral devices, including a modem 20, a sound card 22, and a network card 24. For clarity, many of the buses shown in bus configuration 10 are depicted as not being connected to any devices; it will be recognized that each of the buses may support one or more devices, and the principles of the invention may be applied to any of the buses, regardless of its configuration.

In order to interface with ISA peripherals and other legacy components, a legacy bus 26 is provided, which communicates with PCI bus 0 via a PCI/legacy bridge 28. Under another common configuration, a legacy bus may be connected directly to a host bus using an appropriate host bus/legacy bus bridge. The legacy bus enables the system to use various legacy devices and peripherals, such as ISA cards, legacy disk controllers, keyboards, mice, and video cards, as depicted in a legacy device block 30. Under many systems, the legacy bus must be enabled prior to other buses to successfully boot the systems.

Figure 2:
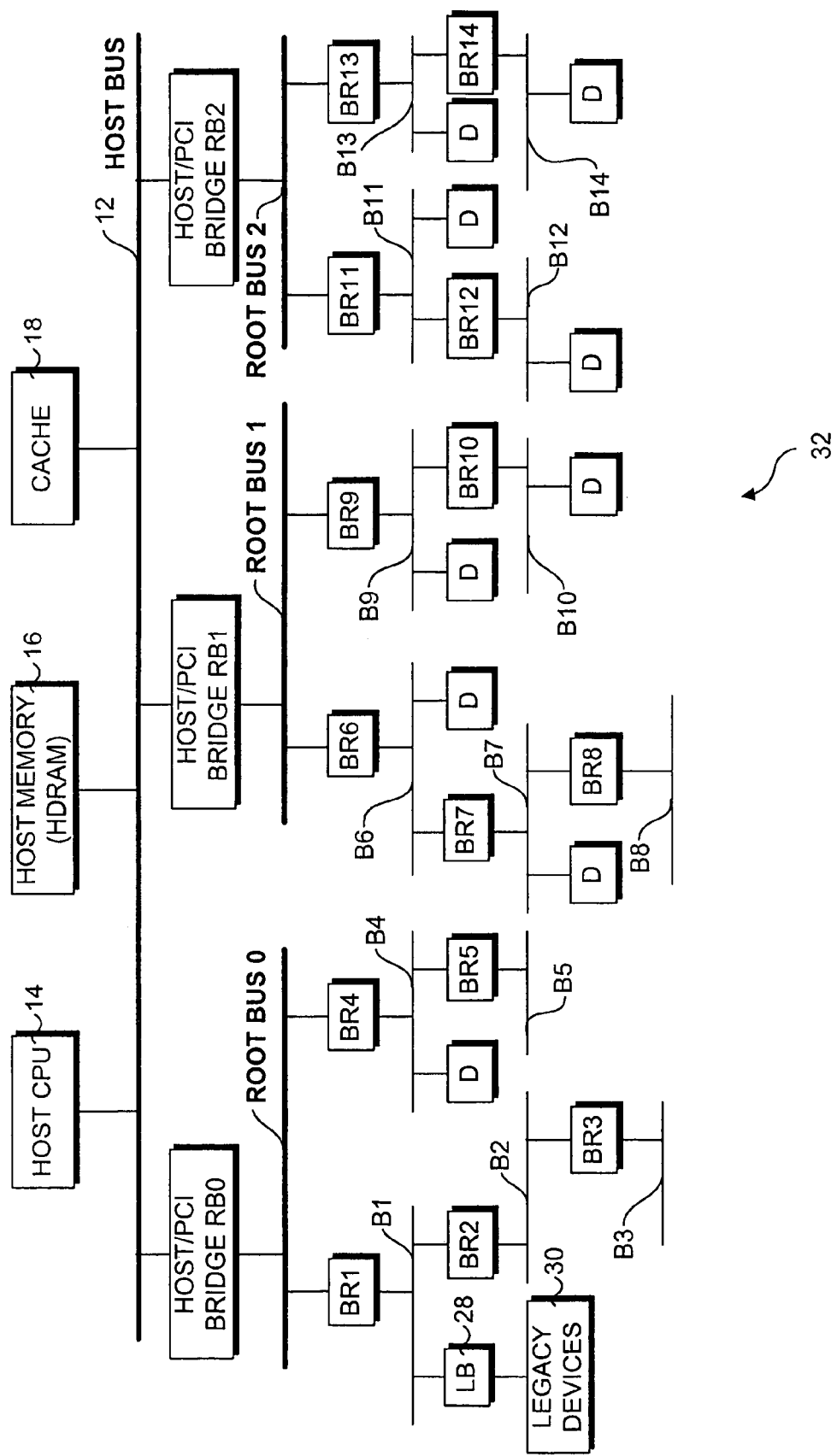
FIG. 2 is a schematic block diagram illustrating an exemplary multiple root bus configuration.

FIG. 2 illustrates an exemplary multiple root bus configuration 32 that includes three root buses, respectively labeled root bus 0, root bus 1, and root bus 2. Each root bus includes several layers of subordinate buses connected by corresponding bridges, which are identified by the blocks labeled "BR#" in FIG. 2. In addition, various devices, depicted as blocks containing a "D," are also included in configuration 32, as well as legacy devices 30 and a PCI-to-Legacy bridge 28.

Figure 3:
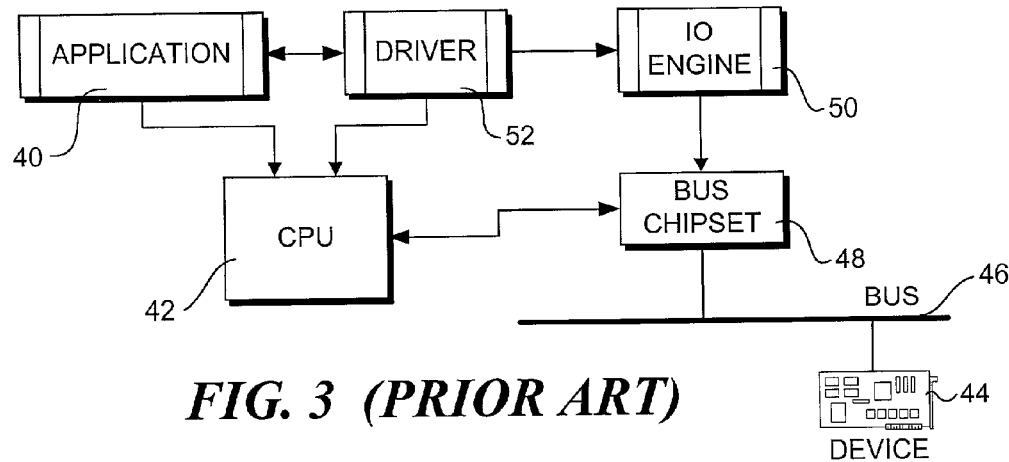
FIG. 3 is a schematic block diagram illustrating a conventional scheme for enabling an application to access a peripheral device.

A conventional scheme for accessing a device is shown in FIG. 3. In this configuration, an application 40 running on a CPU 42 is enabled to access a device 44 connected to a bus 46 that is controlled by a bus chipset 48. Direct IO access with the bus is provided by an IO engine 50 that controls bus access through commands sent to bus chipset 48. Suppose that application 40 desires to read a data register on device 44. This is accomplished by sending an access requests to read the register to a device driver 52 that is also running on CPU 42, which generates an IO read command that is passed to IO engine 50. IO engine 50 then performs the read request through appropriate control signals sent to bus chipset 48, and the data is sent back to device driver 52.

Figure 4:
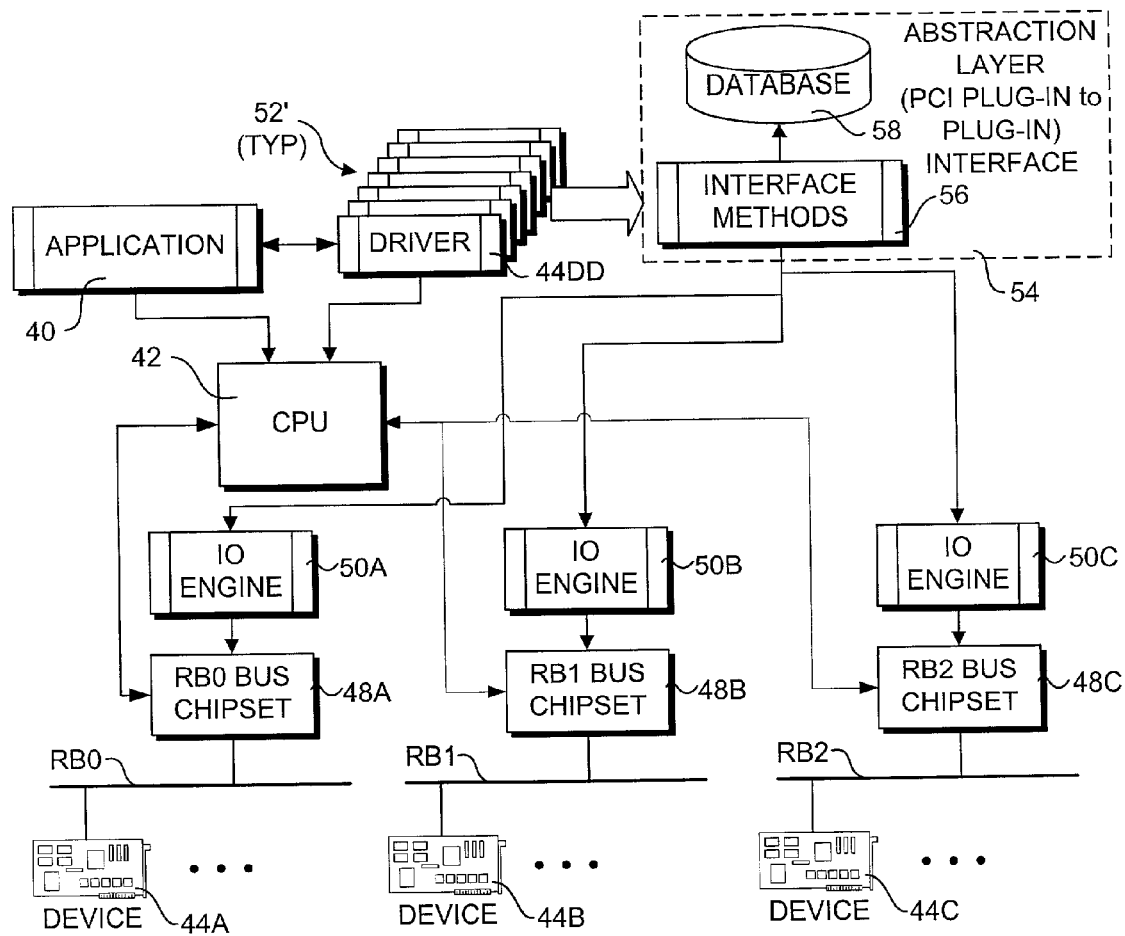
FIG. 4 is a schematic block diagram illustrating how an application may access a peripheral device in accordance with the abstraction layer scheme of the present invention.

In contrast to the conventional scheme, the present invention provides access to devices through use of an abstraction layer PCI plug-in to plug-in (PPI) interface 54, as illustrated in FIG. 4. PPI interface 54 comprises a set of interface methods 56 and a database 58. Database 58 includes bus and device configuration information, resource information, and function information corresponding to the buses and devices in a system. In accordance with an exemplary configuration depicted in FIG. 4, these buses include root buses RB0, RB1, and RB2, to each of which one or more devices is connected, as respectively depicted by devices 44A, 44B, and 44C. For clarity, the devices in FIG. 4 are illustrated as being directly connected to their respective root buses. It will be understood that this is one of many bus/device configurations, and multiple layer bus configurations such as shown in FIGS. 1 and 2 may also be used.

Each of root buses RB0, RB1, and RB2, include a respective root bus chipset and IO engine, which are depicted by bus chipsets 48A–C and IO engines 50A–C. In addition, each of the devices connected to the various buses are accessed by means of a respective driver, depicted collectively as drivers 52'.

Database 58 includes data that creates bindings between a device, its driver, the bus it is connected to, and access methods available to it. In one embodiment, each set of bound data is associated with a GUIDed Root Bus data structure or class, a driver GUID and a unique ID (i.e., handle) during system initialization. During this process, a core dispatcher loads a PCI bus plug-in (PPI) for each entity that can create a root bus. When the plug-in for an entity is loaded, it produces a GUIDed object called a GRB (GUID of PPI for Root Bus) that provides an abstracted representation of the root bus's configuration and resources. The GRB includes a plurality of components including driver methods that may be used to enumerate the root bus corresponding to the GRB. Once the GRB is created, it is published to enable access to devices in the root bus's hierarchy.

PPI interface 54 is used to create Driver-Device-GRB Bindings. The PPI interface creates a database entry for each device. The database associates GUIDs, GRB, Bus, Device, Functions, and Resources. As explained in further detail below, all of these components are known during root bus enumeration. The database is substantially "hidden" from the drivers, preventing device drivers from performing direct IO accesses. However, the access functions to perform IO operations via the PPI interface are made public during bus initialization, and a device driver can perform a desired resource operation by passing it's Unique ID, Driver ID, Source and Target Resource Description along with a requested IO operation to the PPI interface using a public access function.

Since multiple root buses may have multiple root-bus access mechanisms, resource constraints, parent-child associations, special mechanisms to enable/disable root buses, and/or separate IO access mechanisms, each entity defines these components through an object definition for its corresponding root bus. During a root bus enumeration process, all the GRBs corresponding to respective root buses in a system are searched in via the core. Once all of the GRBs are identified, then subordinate buses and devices for each root bus are enumerated through use of the GRB's access mechanisms, resource constraints, IO access mechanisms, and parent-child relationships published for that root bus.

Figure 5:
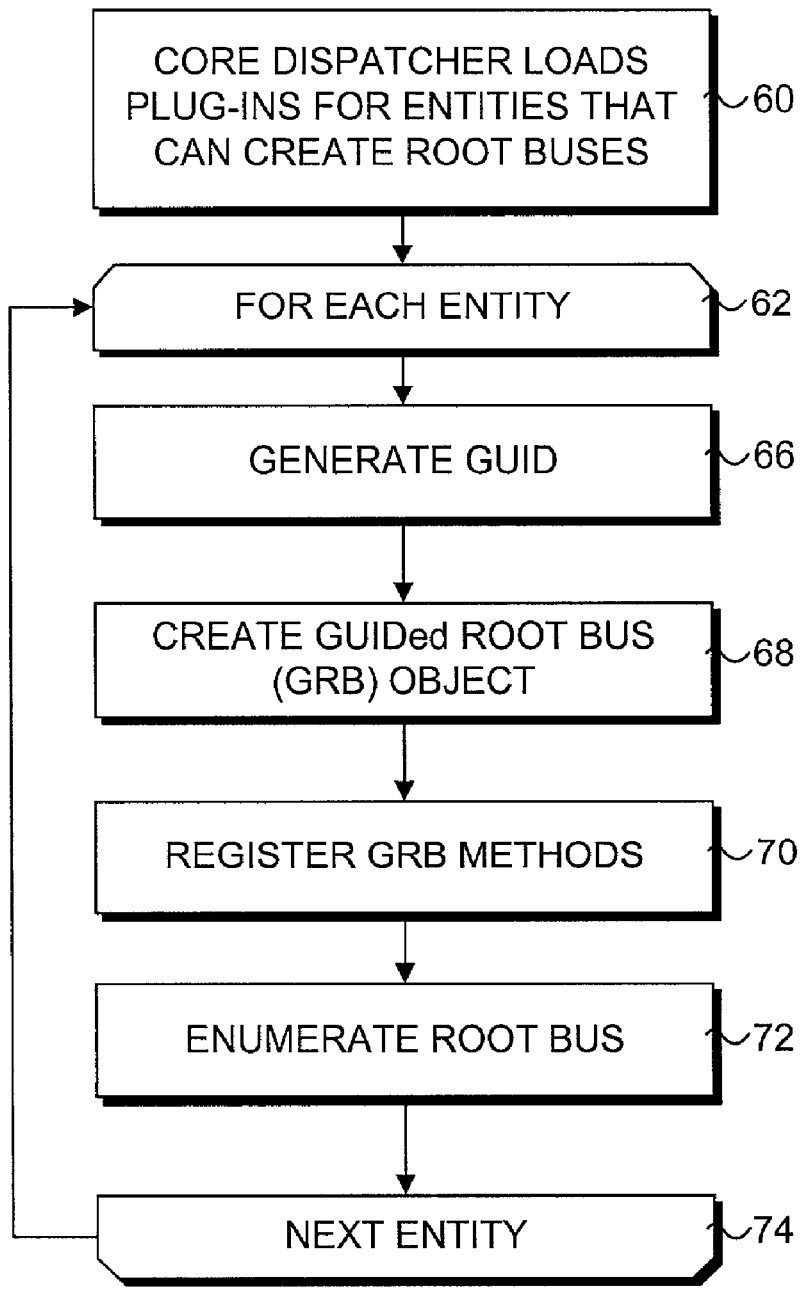
FIG. 5 is a flowchart for illustrating the logic used by the invention when creating a GUIDed object comprising an objected-oriented representation of each root bus in a system.

With reference to FIG. 5, a process for creating the GUIDed objects begins in a block 60 in which a core dispatcher loads plug-ins (i.e., software drivers) for entities that can create root buses. The core dispatcher comprises a core software component that is responsible for initializing and/or registering a plug-in. The entities that can create root buses typically may include chipsets that are used to control access to a root bus. For example, many PCI buses are controlled by an Intel 82870 chipset. The loading of plug-ins generally may occur during the POST (power-on self-test) operation of the platform, or optionally during a similar platform initialization operation.

As depicted by respective start loop and end loop blocks 62 and 64, a loop comprising several operations is performed for each entity, as follows. First, a GUID (global unique identifier) is generated in a block 66. Next, a GUIDed Root Bus (GRB) object is created in a block 68 comprising an object-oriented abstraction that identifies a plurality of methods that may be used to determine the configuration and resource requirements of a corresponding root bus, and includes one or more variables in which configuration and resource information can be stored, either directly, or through data identified by those variables (e.g., stored in a subordinate class that references the GRB). Preferably, the abstracted object may be represented by a C++ or Java class definition. The GRB object is identified by the GUID, and thus is referred to herein as a GUIDed object.

An exemplary GRB is presented below:

GRB (GUID of PPI for ROOT BUS)

```
Struct GRB {
    Struct GRB *Next;          // Needed for ordered initialization
    Boolean MustBeBusZero;     // At most ON in one element, Must be 1st element if ON
    UINT32 PrimaryBus;
    UINT32 SubordinateBus;
    // Methods
    PCIConfigRead () ;
    PcIConfigWrite () ;
    PCISetPriSubBus () ;
    PCIGetPriSubBus () ;
    PCISetIOAperture () ;
    PCIGetIOAperture () ;
    PCISetMemAperture () ;
    PCIGetMemAperture () ;
    PCIPushResourceAmount () ;
    AllocResourceAmount () ;
    DoneResourceAlloc () ;
}
```

The GRB is identified by its GUID, which is simply the name of the GRB. The GRB's methods may be obtained through publication of the GRB by the plug-in for the entity, or by interrogating the plug-in.

After the GRB's methods are determined, the methods are registered with the core in a block 70. Using the GRB and its registered methods, the root bus corresponding to the GRB is then enumerated in a block 72, and the logic proceeds to evaluate the root bus corresponding to the next entity, if such a root bus exists. Once all of the root buses are evaluated in this manner, the process is complete.

Figure 6:
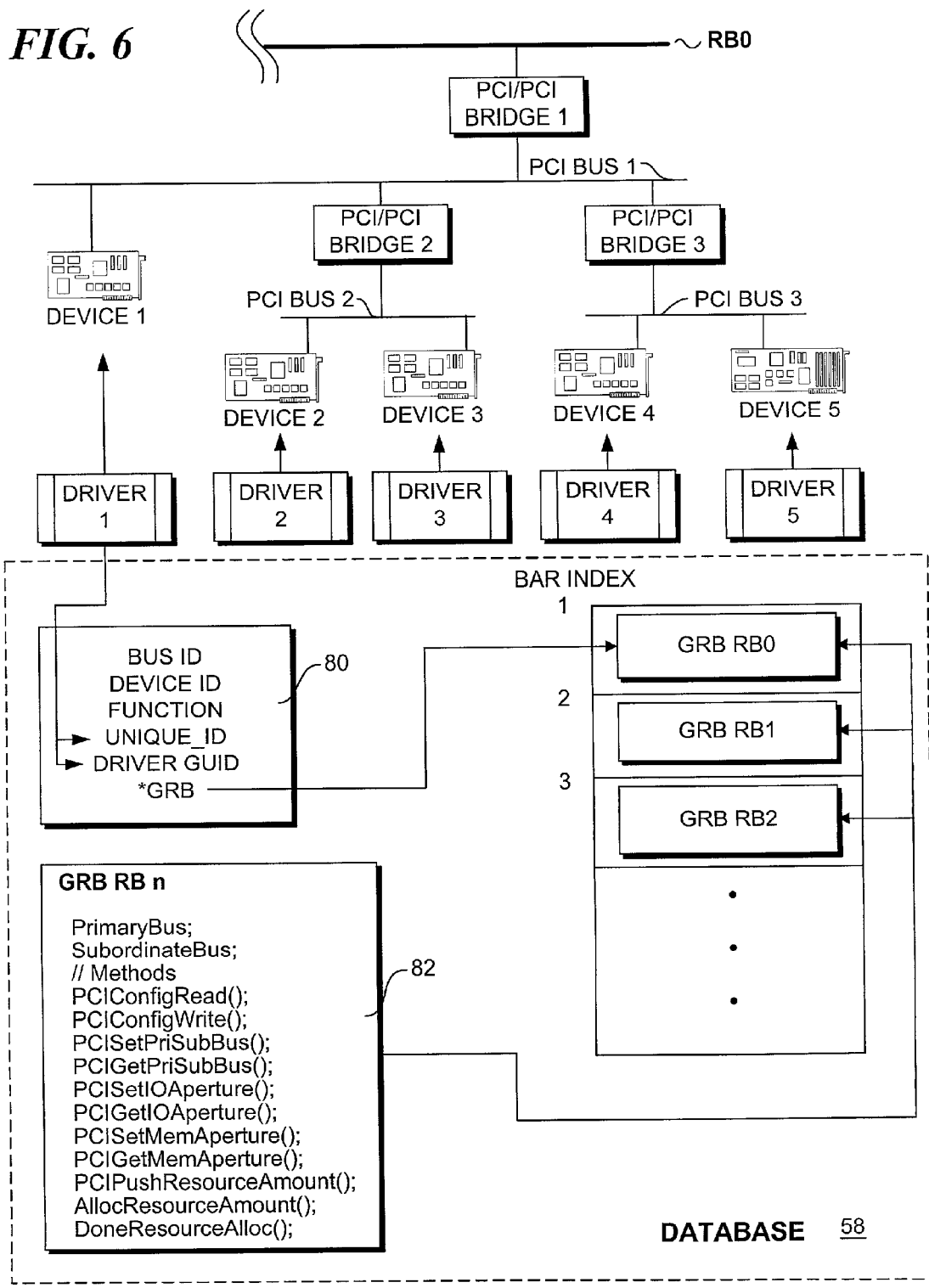
FIG. 6 is a schematic block diagram illustrating various entities that are stored in the database and how those entities are accessed.

An exemplary configuration illustrating the relationship between devices, drivers, and GRBs is shown in FIG. 6. The hardware side of the configuration includes a root bus RB0, PCI buses 1, 2, and 3, and PCI/PCI bridges 1, 2, and 3. A device 1 is connected to PCI bus 1, while devices 2 and 3 are connected to PCI bus 2, and devices 4 and 5 are connected to PCI bus 3. Access to each of devices 1–5 is provided by respective device drivers, labeled driver 1–5.

As discussed above, buses and devices are enumerated during a system initialization process, with this information being accessible through use of the GRBs created during the process. Accordingly, database 58 includes a record 80 for each device that identifies the bus the device is connected to, the device's enumerated ID, a PCI bus function for the device, a unique ID, a pointer to the driver's GUID, and a pointer to the GRB for the bus the device is connected to, as shown below:

```
Struct PCI_com_channel_record{
    Int Bus;
    Int Device;
    Int Function;
    Int Unique_ID;
    Int* Driver GUID;
    Struct GRB* GUIDed_Root_Bus_Structure;
}
```

Database 58 also includes information corresponding to the GRBs that is produced during system initialization, as depicted by a GRB 82. The GRB information may be stored in memory as stacked objects (e.g., fixed or variable length records) that can be accessed using the GRB's Handle.

Figure 7:
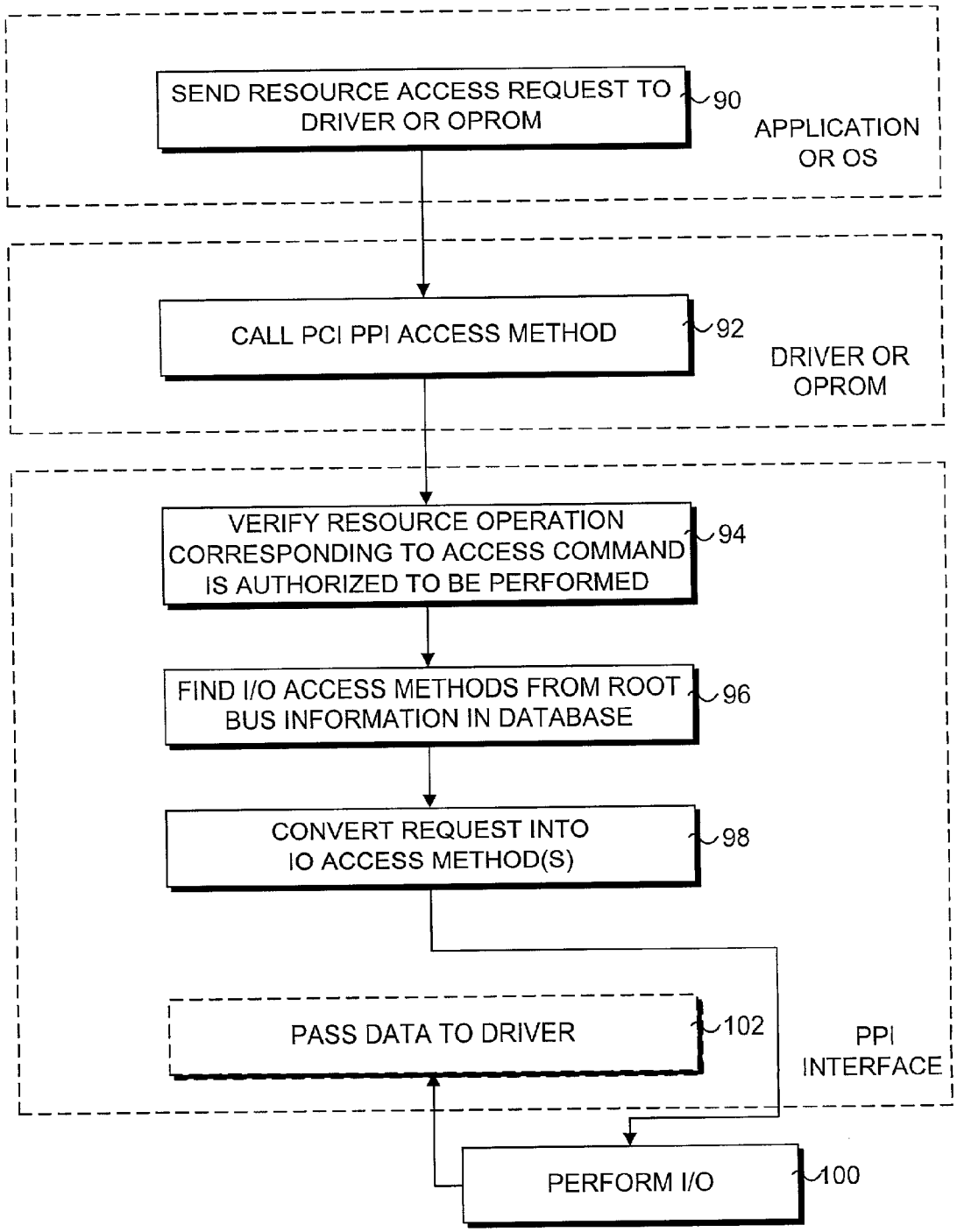
FIG. 7 is a flowchart for illustrating the logic used by the invention when an application accesses a peripheral device.

With reference to the flowchart of FIG. 7 and FIGS. 4 and 6, an application or OS accesses a device in the following manner. First, the application or OS send a resource access request to a driver or OPROM corresponding to the device the application or OS desires to access in a block 90. For example, suppose application 40 seeks to access device 44B, which has a corresponding device driver 44DD. Application 40 sends a resource access request (e.g., memory write) to device driver 44DD. The driver or OPROM then issues a resource access command to PPI interface 54, as provided by a block 92. This is done by calling a PPI interface access function (PCI_Function_PPI( )), which has been made public and published by PPI interface 54 to enable drivers and OPROMs to issue resource access commands to PPI interface 54.

The format for the PCI_Function_PPI method call is:
PCI_Function_PPI (*Driver_Resource_Rec, & Status)
Wherein Driver_Resource_Rec is defined by:

```
Typedef struct{
    UINT32                  NUMBER_ADDRESS_BITS,
    PCI_RESOURCE            *RESOURCE,
    DRIVER_RESOURCE_REC     *NEXT_RESOURCE
} DRIVER_RESOURCE_REC;
Typedef struct{
    RESOURCE_TYPE           TYPE,
    GUID                    PCI_PI_GUID,
    UINT32                  PCI_UNIQUE_ID,
    COMMAND                 ACTION,
    UINT32                  RESOURCE_SIZE,
    UINT32                  PCI_BAR_INDEX,
    UINT32                  PCI_BASE_ADDRESS_
                            OFFSET,
    UINT32                  RW_GRANULARITY,
    VOID                    *RW_BUFFER
}PCI_RESOURCE
and resource access Commands include:
Typedef enum {
    Memory_Read,    // Read from Memory Read
    Memory_Write,   // Write to Memory
    IO_Read,        // Read from IO address
    IO_Write,       // Write to IO address
    Get_IRQ,        // Get Interrupt Request (IRQ)
    Set_IRQ,        // Set IRQ
    Get_GRB,        // Get GRB structure
} COMMAND;
``` and Status is defined by:

```
Typedef STATUS{
    Invalid_BusDevFn,
    Invalid_Memory_Request,
    Invalid_IO_Request,
    Invalid_IRQ_Request,
    Unavailable_Memory_Resource,
    Unavailable_IO_Resource,
    Unavailable_IRQ_Resource,
    Invalid_GUID,
    Invalid_ID,
    Invalid_Base_Register_Index,
    Access_Violation,
    Unable_To_Shut_Decode,
    Device_Disabled,
    Memory_Out_Of_range,
    IO_Out_Of_range
}
```

The resource commands include resource actions, PCI read and write actions, and GRB queries. Since the foregoing structures enable resources to be defined as linked lists, any driver can request a set of actions to be performed serially. For example, the following code segment and comments illustrate a memory read of a Device 0 from a PCI Register 0×14 and an offset of 0×0 to My_Buffer:

```
            DEVICE_RESOURCE_REC      device_rec [2]1;
            PCI_RESOURCE             resource [2];
            UINT8*                   My_Buffer [0x100];
Device_rec[0] .NUMBER_ADDRESS_BITS = 0x40;      // 64 bit address
Device_rec[0] .RESOURCE = &resource[0];         // Point to Resource
Device_rec[0] .NEXT_RESOURCE = &device_rec[1];  // Next Action in the
                                                   chain
Resource[0] .TYPE = MEMORY_RESOURCE;            // Memory Kind of
                                                   resource
Resource[0] . PCI_PI_GUID = DeviceA_PI_GUID;    // My GUID
Resource[0] . PCI_UNIQUE_ID = DeviceA_ID;       // My ID
Resource[0] . ACTION = Memory_Read;             // I have to Read
                                                   Memory
Resource[0] . RESOURCE_SIZE = 0x10;             // of length 16 bytes
Resource[0] . PCI_BAR_INDEX = 0x14;             // whose base is given
                                                   at Pci Reg 0x14
Resource[0] . PCI_BASE_ADDRESS_OFFSET = 0x0;    // from base address +
                                                   0x0
Resource[0] . RW_GRANULARITY = 0x1;             // I can do 8 bit RW
Resource[0] . BUFFER = My_Buffer;               // Copy to My_Buffer
```

The resource access command is received by PPI interface 54, and a verification to whether a resource operation corresponding to the resource access command may be performed is determine against data in database 58 in a block 94 by identifying the resource request and checking permissions. The GRB corresponding to the root bus the device is connected to is identified in a block 96, and resource access methods and configuration read methods corresponding to the device are identified. In a block 98, the resource access command is converted into one or more resource (e.g., IO) access methods by identifying BAR addresses (if required) using the configuration read methods identified in block 96 and adding offsets to the BAR addresses. The resource access method(s) are then used to perform the requested resource operation in a block 100, and data is passed back to the driver (if appropriate) in a block 102.

Exemplary System for Implementing the Invention

Figure 8:
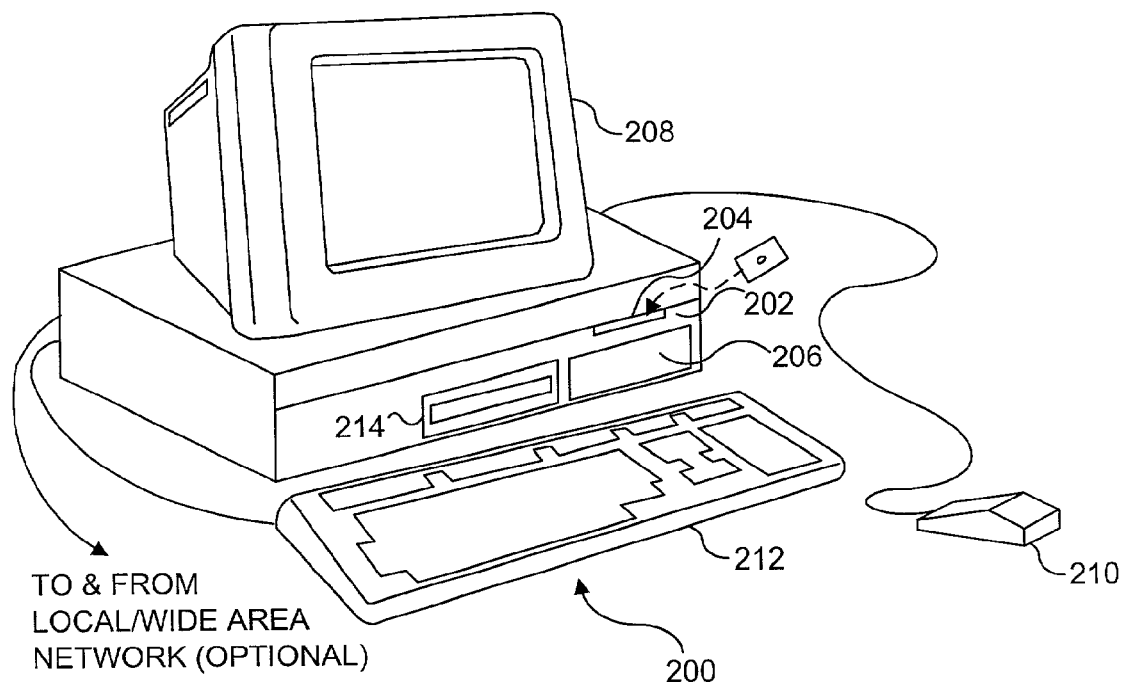
FIG. 8 is a schematic diagram illustrating an exemplary system for implementing the invention.

With reference to FIG. 8, a generally conventional personal computer 200 is illustrated, which is suitable for use in connection with practicing the present invention. Alternatively, a corresponding server, or workstation on a local area network may be used for executing machine instructions comprising one or more modules that causes the present invention to be performed when the instructions are executed. Personal computer 200 includes a processor chassis 202 in which are mounted a floppy disk drive 204, a hard drive 206, a motherboard populated with appropriate integrated circuits (not shown), and a power supply (also not shown), as are generally well known to those of ordinary skill in the art. A monitor 208 is included for displaying graphics and text generated by software programs that are run by the personal computer, and for graphically representing models of objects produced by the present invention. A mouse 210 (or other pointing device) is connected to a serial port (or to a bus port) on the rear of processor chassis 202, and signals from mouse 210 are conveyed to the motherboard to control a cursor on the display and to select text, menu options, and graphic components displayed on monitor 208 by software programs executing on the personal computer. In addition, a keyboard 212 is coupled to the motherboard for user entry of text and commands that affect the running of software programs executing on the personal computer.

Personal computer 200 also optionally includes a compact disk-read only memory (CD-ROM) drive 214 into which a CD-ROM disk may be inserted so that executable files and data on the disk can be read for transfer into the memory and/or into storage on hard drive 206 of personal computer 200. Other mass memory storage devices such as an optical recorded medium or DVD drive may be included. The machine instructions comprising the software program and/ or modules that causes the CPU to implement the functions of the present invention that have been discussed above will likely be distributed on floppy disks or CD-ROMs (or other memory media) and stored in the hard drive until loaded into random access memory (RAM) for execution by the CPU. Optionally, the software may be downloaded from a network.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Accordingly, it is not intended that the scope of the invention in any way be limited by the above description, but instead be determined entirely by reference to the claims that follow.

What is claimed is:

1. A method for accessing a device, comprising:
   creating a corresponding global unique identifier root bus object for each of a plurality of root buses in a system to which the device may be coupled, wherein each root bus is capable of having one or more devices coupled thereto, wherein each globally unique identifier root bus object includes an object-oriented abstraction that identifies a plurality of methods that may be used to determine a configuration of the corresponding root bus and to determine resource requirements of the corresponding root bus;
   sending a resource access request to a device driver or OPROM corresponding to the device;

sending a resource access command corresponding to the resource access request from the device driver or OPROM to an abstraction layer interface;

verifying whether a resource operation corresponding to the resource access command is authorized to be performed on the device;

determining a resource access method(s) that may be implemented to cause the device to perform the resource operation, wherein the resource access method(s) is responsive to at least one created global unique identifier root bus object; and calling the resource access method(s) to perform the resource operation on the device;

wherein the abstraction layer interface hides the resource access method(s) from the device driver or OPROM.

2. The method of claim 1, wherein the resource access request comprises requesting data to be read from the device, further comprising returning data read from the device to the device driver or OPROM.

3. The method of claim 1, wherein the abstraction layer interface includes a database from which resource access methods corresponding to the device can be determined.

4. The method of claim 1, wherein the abstraction layer interface includes a database containing data corresponding to a configuration of a root bus to which the device is directly or indirectly connected and resource information corresponding to any devices in a hierarchy of the root bus.

5. The method of claim 4, wherein the data corresponding to the root bus configuration and resources is represented by an object-oriented abstraction comprising a set of components that includes reference to one or more configuration methods that may be implemented to obtain and/or generate configuration and resource allocation information for the root bus and any devices and subordinate buses in the root bus hierarchy.

6. The method of claim 1, wherein the abstraction layer interface hides resource access methods for the device from the device driver or OPROM so that the device driver or OPROM may not directly access the device with those access methods.

7. A method for providing access to devices in a system that includes a plurality of root buses, comprising:

creating a corresponding global unique identifier root bus object for each of the plurality of root buses, wherein each root bus is capable of having one or more devices coupled thereto, wherein each globally unique identifier root bus object includes an object-oriented abstraction that identifies a plurality of methods that may be used to determine a configuration of the corresponding root bus and to determine resource requirements of the corresponding root bus:

storing configuration and resource information corresponding to each of said plurality of root buses and any devices and subordinate buses in a hierarchy for that root bus;

providing an abstraction layer interface that enables device drivers or OPROMs corresponding to the devices to perform resource operations on the devices through resource access methods corresponding to those devices, wherein the resource access methods is responsive to at least one created global unique identifier root bus object, said abstraction layer hiding such resource access methods from the device drivers or OPROMs so as to prevent the device drivers or OPROMs from directly implementing the resource access methods to perform resource operations on their corresponding devices;

passing identification information and one or more resource access commands from one or more of the device drivers or OPROMs to the abstraction layer interface;

verifying whether a resource operation to be performed on one of the devices, the one of the devices corresponding to said one or more resource access commands is authorized based on the identification information and the configuration and resource information that is stored; and performing the resource operation on the device if it is authorized to be performed, the resource operation being performed on the device in a manner such that the abstraction layer interface hides the resource access method(s) from the device driver or OPROM.

8. The method of claim 7, wherein the configuration and resource information for each root bus is represented as an object-oriented abstraction comprising a set of components that includes reference to one or more configuration methods that may be implemented to obtain or generate configuration and resource information for the root bus and any devices and subordinate buses in the root bus hierarchy.

9. The method of claim 8, wherein the object-oriented abstractions for the root buses are stored in a database that is accessible by the abstraction layer interface.

10. The method of claim 9, further comprising providing a record for each device in the database identifying the device, a device driver or OPROM for the device, and the object-oriented abstraction corresponding to the root bus for the device.

11. The method of claim 7, further comprising publishing a public interface method that enables device drivers or OPROMs to access devices via the abstraction layer interface by passing identification, resource, and resource access command(s) to the abstraction interface.

12. An article of manufacture comprising a computer-readable medium having computer-executable instructions that when executed enable access to a device by:

creating a corresponding global unique identifier root bus object for each of a plurality of root buses in a system to which a device may be coupled, wherein each root bus is capable of having one or more devices coupled thereto, wherein each globally unique identifier root bus object includes an object-oriented abstraction that identifies a plurality of methods that may be used to determine a configuration of the corresponding root bus and to determine resource requirements of the corresponding root bus;

sending a resource access request to a device driver or OPROM corresponding to the device;

sending a resource access command corresponding to the resource access request from the driver to an abstraction layer interface;

verifying whether a resource operation corresponding to the resource access command is authorized to be performed on the device;

determining a resource access method(s) that may be implemented to cause the device to perform the resource operation, wherein the resource access method(s) is responsive to at least one created global unique identifier root bus object; and calling the resource access method(s) to perform the resource operation on the device in a manner such that the abstraction layer interface hides the resource access method(s) from the device driver or OPROM.

13. The article of manufacture of claim 12, wherein the resource access request comprises requesting data to be read from the device, and wherein execution of the instructions further performs the function of returning data read from the device to the device driver or OPROM.

14. The article of manufacture of claim 12, wherein execution of the instructions further performs the function of creating a database containing data corresponding to a configuration of a root bus to which the device is directly or indirectly connected to and resource information corresponding to any devices in a hierarchy of the root bus.

15. The article of manufacture of claim 12, wherein the data corresponding to the root bus configuration and resources is represented by an object-oriented abstraction comprising a set of components that includes reference to one or more configuration methods that may be implemented to obtain and/or generate configuration and resource allocation information for the root bus and any devices and subordinate buses in the root bus hierarchy.

16. The article of manufacture of claim 12, wherein the abstraction layer interface hides resource access methods for the device from the device driver or OPROM so that the device driver or OPROM may not directly access the device with those access methods.

17. An article of manufacture comprising a computer-readable medium having computer-executable instructions that when executed provide access to devices in a system that includes a plurality of root buses by;
creating a corresponding global unique identifier root bus object for each of a plurality of root buses in a system to which a device may be coupled, wherein each root bus is capable of having one or more devices coupled thereto, wherein each globally unique identifier root bus object includes an object-oriented abstraction that identifies a plurality of methods that may be used to determine a configuration of the corresponding root bus and to determine resource requirements of the corresponding root bus;
storing configuration and resource information corresponding to each of said plurality of root buses and any devices and subordinate buses in a hierarchy for that root bus;
providing an abstraction layer interface that enables device drivers or OPROMs for the devices to perform resource operations on the devices through resource access methods corresponding to those devices, said abstraction layer hiding such resource access methods from the device drivers or OPROMs so as to prevent the device drivers or OPROMs from directly implementing the resource access methods to perform resource operations on their corresponding devices, wherein the resource access methods are responsive to at least one created global unique identifier root bus object;
passing identification information and one or more resource access commands from the device drivers or OPROMs to the abstraction layer interface;
verifying whether a resource operation(s) to be performed on a device corresponding to said one or more resource access commands is authorized based on the identification information and the configuration and resource information that is stored; and
performing the resource operation on the device if it is authorized to be performed, the resource operation being performed in a manner such that the abstraction layer interface hides the resource access method(s) from the device driver or OPROM.

18. The article of manufacture of claim 17, wherein the configuration and resource information for each root bus is represented as an object-oriented abstraction comprising a set of components that includes reference to one or more configuration methods that may be implemented to obtain and/or generate configuration and resource information for the root bus and any devices and subordinate buses in the root bus hierarchy.

19. The article of manufacture of claim 18, wherein the object-oriented abstractions for the root buses are stored in a database that is accessible by the abstraction layer interface, and execution of the instructions further performs the function of providing a record for each device in the database identifying the device, a device driver or OPROM for the device, and the object-oriented abstraction corresponding to the root bus for the device.

20. A computer system comprising:
a memory in which a plurality of instructions are stored;
a device;
a root bus to which the device is operatively coupled; and
a processor connected to the root bus and the memory, said plurality of instructions when executed by the processor causing functions to be performed including:
creating a global unique identifier root bus object for the root bus, wherein the globally unique identifier root bus object includes an object-oriented abstraction that identifies a plurality of methods that may be used to determine a configuration of the root bus and to determine resource requirements of the root bus;
sending a resource access request to a device driver or OPROM corresponding to the device;
sending a resource access command corresponding to the resource access request from the device driver or OPROM to an abstraction layer interface;
verifying whether a resource operation corresponding to the resource access command is authorized to be performed on the device;
determining a resource access method(s) that may be implemented to cause the device to perform the resource operation, wherein the resource access method(s) is responsive to at least one created global unique identifier root bus object; and
calling the resource access method(s) to perform the resource operation on the device in a manner such that the abstraction layer interface hides the resource access method(s) from the device driver or OPROM.

21. The system of claim 20, wherein the resource access request comprises requesting data to be read from the device, and wherein execution of the instructions further performs the function of returning data read from the device to the device driver or OPROM.

22. The system of claim 20, wherein execution of the instructions further performs the function of creating a database containing data corresponding to a configuration of a root bus to which the device is directly or indirectly connected to and resource information corresponding to any devices in a hierarchy of the root bus.

23. The system of claim 20, wherein the data corresponding to the root bus configuration and resources is represented by an object-oriented abstraction comprising a set of components that includes reference to one or more configuration methods that may be implemented to obtain and/or generate configuration and resource allocation information for the root bus and any devices and subordinate buses in the root bus hierarchy.

24. The system of claim 20, wherein the abstraction layer interface hides resource access methods for the device from the device driver or OPROM so that the device driver or OPROM may not directly access the device with those access methods.

25. A computer system comprising:
a memory in which a plurality of instructions are stored;
a plurality of root buses;
a plurality of devices connected to the root buses; and
a processor connected to the root buses and the memory, said plurality of instructions when executed by the processor causing functions to be performed including:
creating a corresponding global unique identifier root bus object for each of the plurality of root buses, wherein each globally unique identifier root bus object includes an object-oriented abstraction that identifies a plurality of methods that may be used to determine a configuration of the corresponding root bus and to determine resource requirements of the corresponding root bus;
storing configuration and resource information corresponding to each of said plurality of root buses and any devices and subordinate buses in a hierarchy for that root bus;
providing an abstraction layer interface that enables device drivers or OPROMs for the devices to perform resource operations on the devices through resource access methods corresponding to those devices, said abstraction layer hiding such resource access methods from the device drivers or OPROMs so as to prevent the device drivers or OPROMs from directly implementing the resource access methods to perform resource operations on their corresponding devices, wherein the resource access methods are responsive to at least one created global unique identifier root bus object;
passing identification information and resource access command(s) from device drivers or OPROMs to the abstraction layer interface;
verifying whether a resource operation to be performed on a device corresponding to the resource access command(s) is authorized based on the identification information and the configuration and resource information that is stored; and
performing the resource operation on the device if it is authorized to be performed, the resource operation being performed in a manner such that the abstraction layer interface hides the resource access method(s) from the device driver or OPROM.

26. The system of claim 25, wherein the configuration and resource information for each root bus is represented as an object-oriented abstraction comprising a set of components that includes reference to one or more configuration methods that may be implemented to obtain and/or generate configuration and resource information for the root bus and any devices and subordinate buses in the root bus hierarchy.

27. The system of claim 26, wherein the object-oriented abstractions for the root buses are stored in a database that is accessible by the abstraction interface layer, and execution of the instructions further performs the function of providing a record for each device in the database identifying the device, a device driver or OPROM for the device, and the object-oriented abstraction corresponding to the root bus for the device.

* * * * *